June 25, 1935. F. B. HURT 2,005,896
AGGREGATE SPREADER
Filed Nov. 19, 1932 6 Sheets-Sheet 1
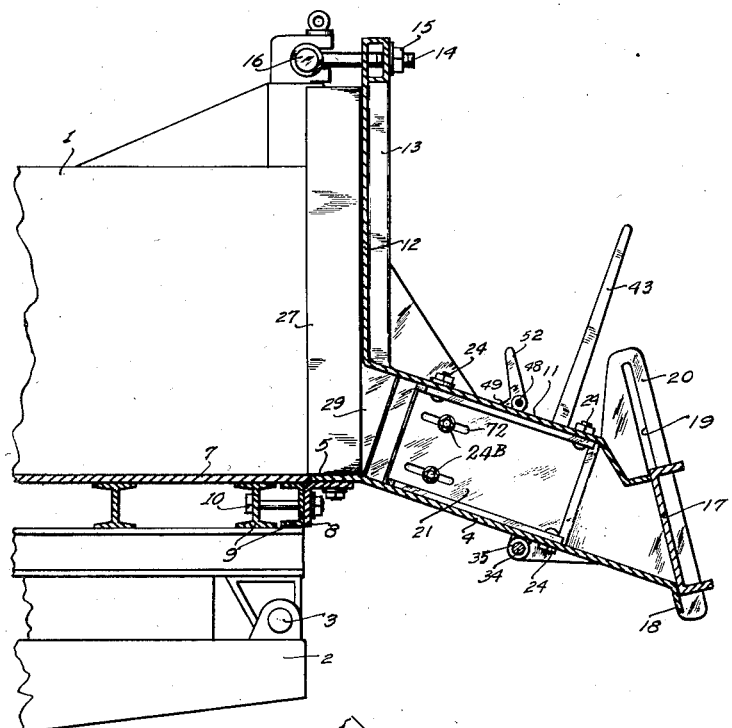
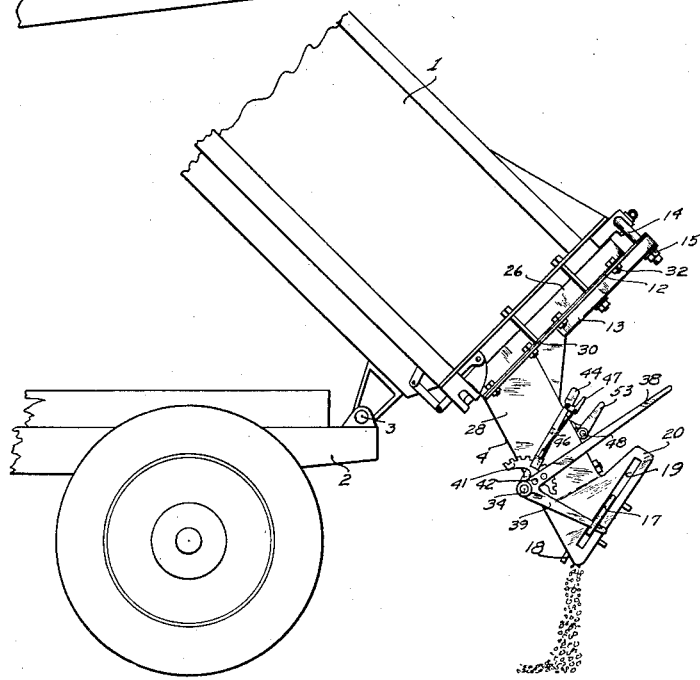
Inventor
Frank B. Hurt
By
Attorney

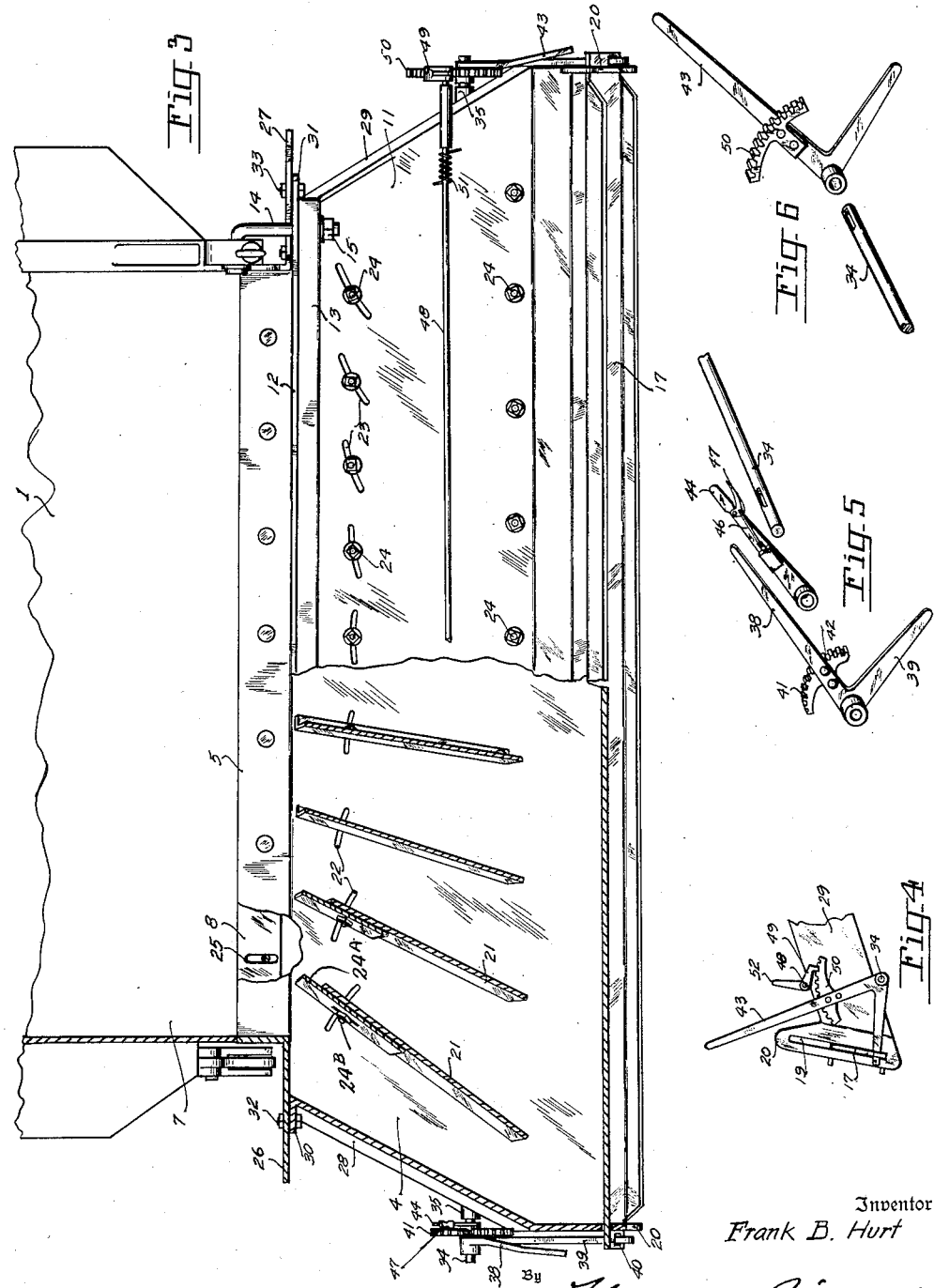

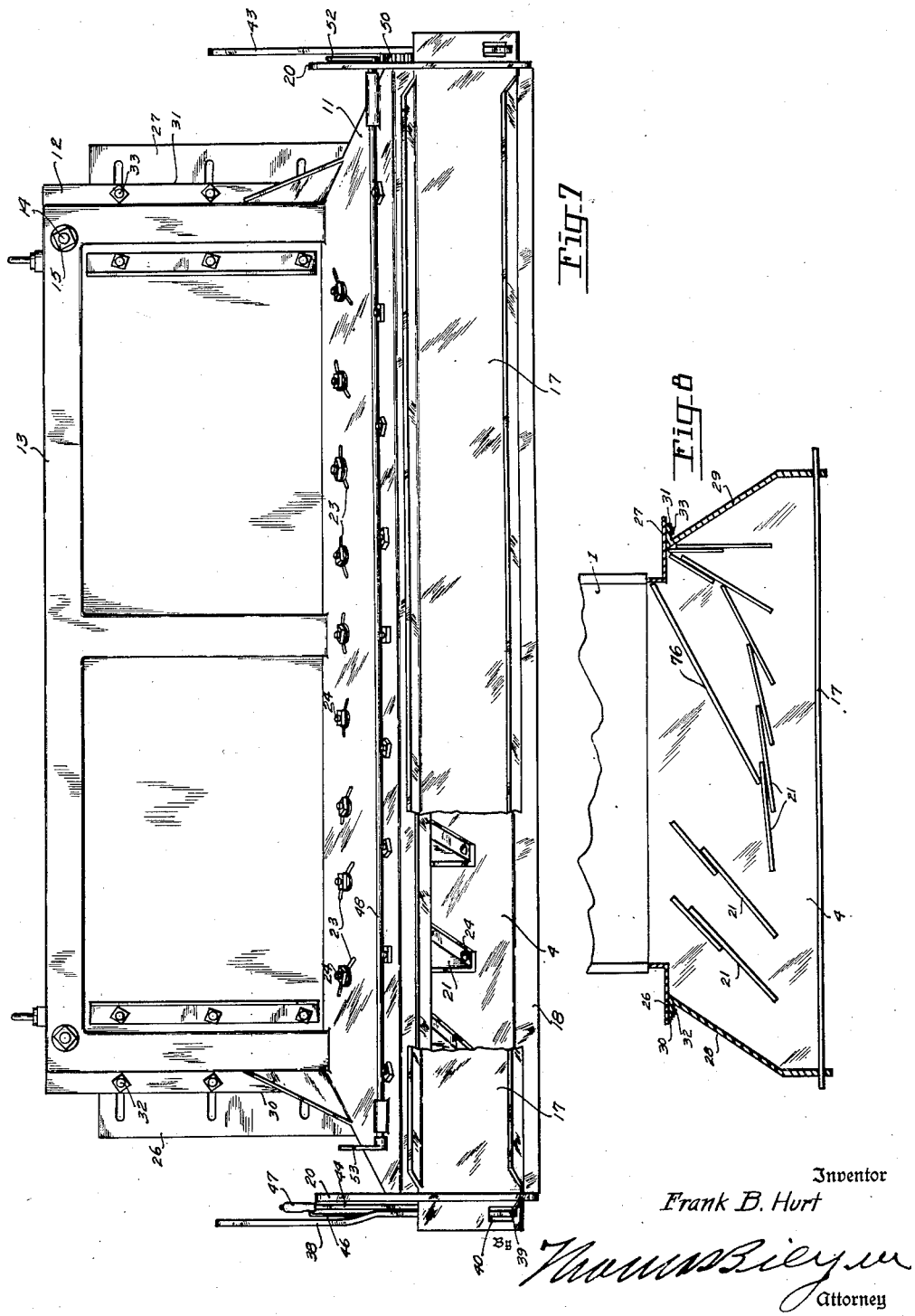

June 25, 1935.  F. B. HURT  2,005,896
AGGREGATE SPREADER
Filed Nov. 19, 1932  6 Sheets-Sheet 4
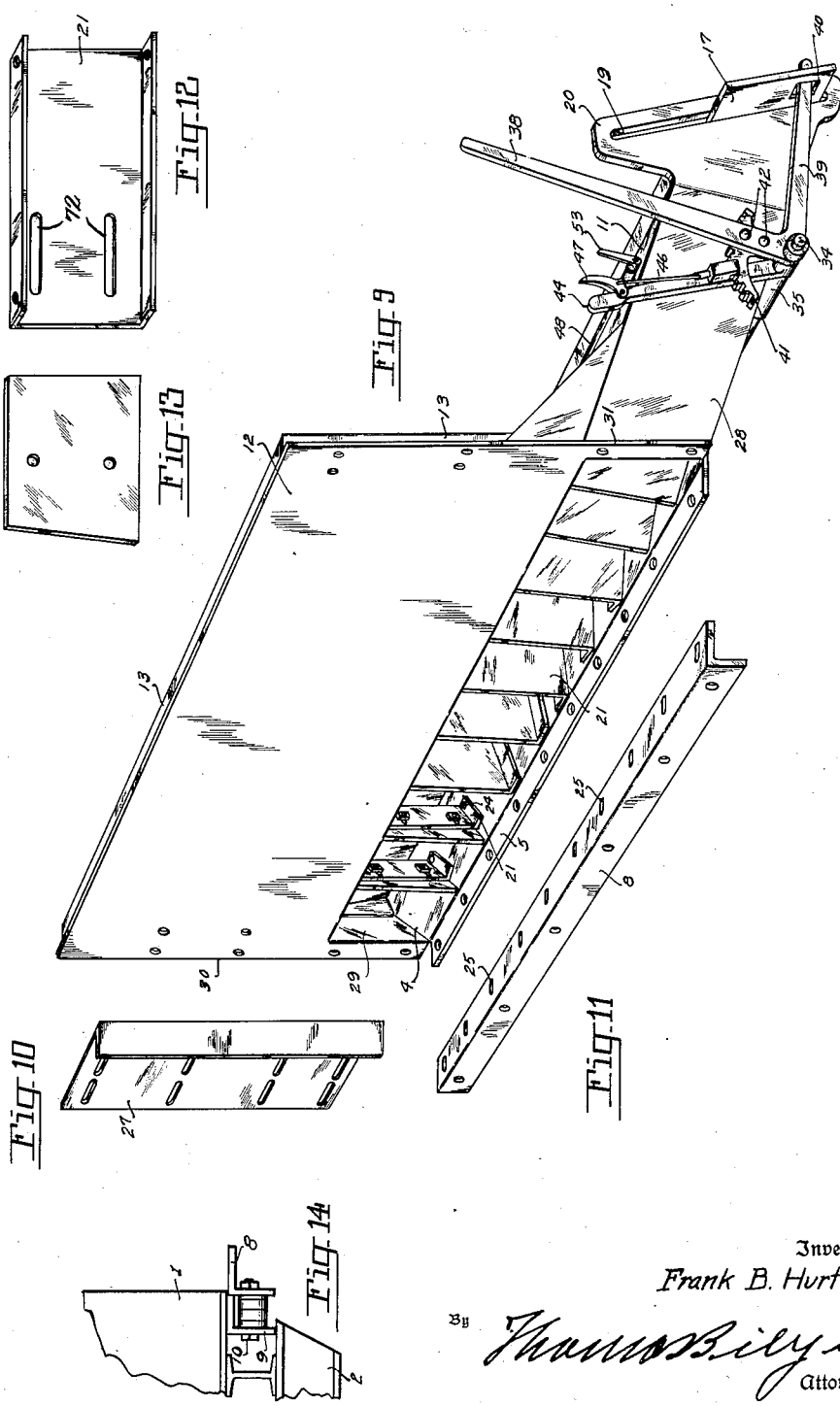
Inventor
Frank B. Hurt
By Thomas B. ily m
Attorney

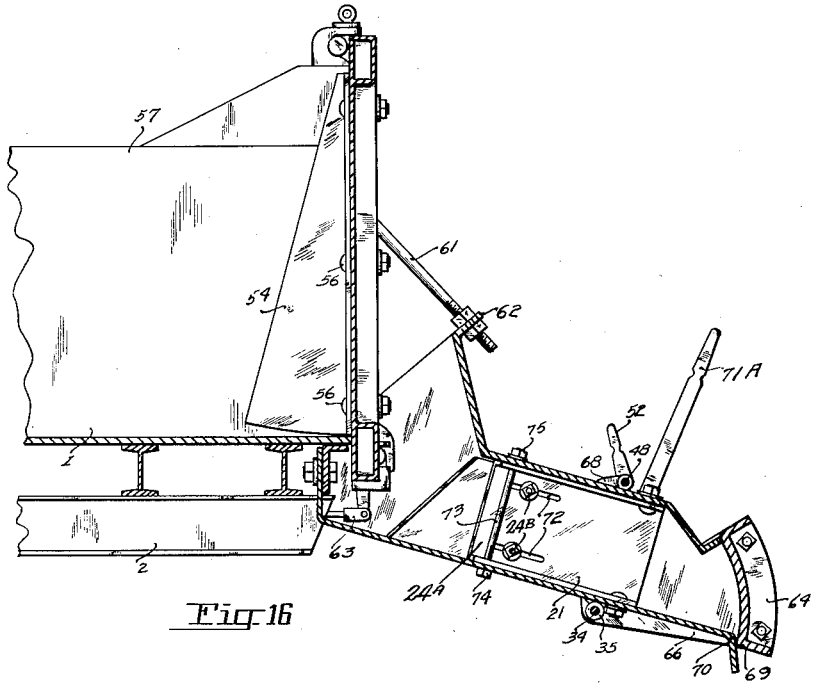
Fig. 16
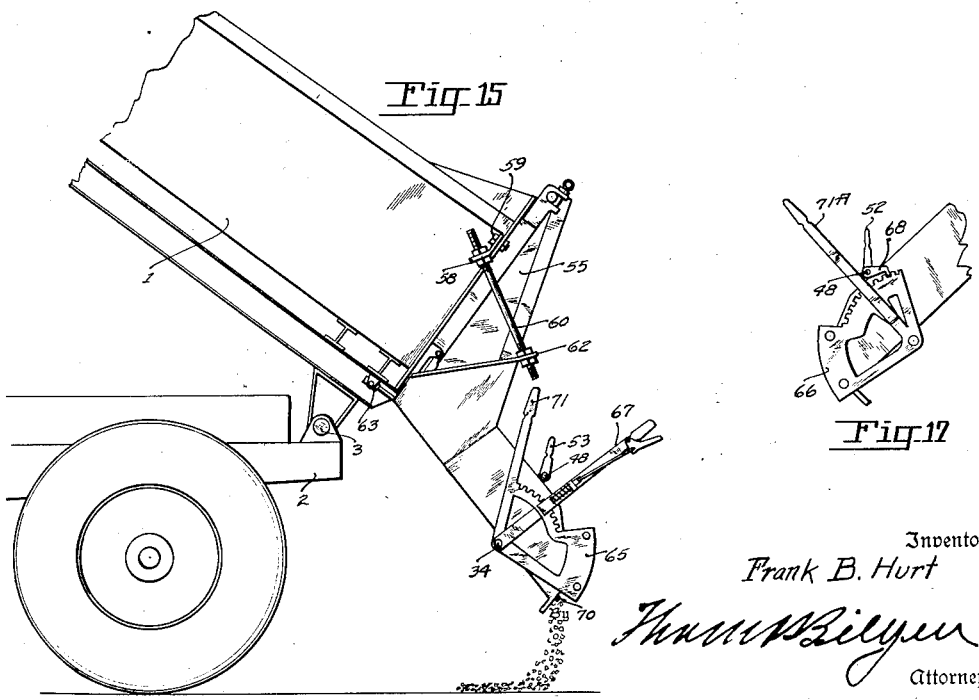
Fig. 15
Fig. 17
Inventor
Frank B. Hurt

June 25, 1935.  F. B. HURT  2,005,896
AGGREGATE SPREADER
Filed Nov. 19, 1932   6 Sheets-Sheet 6

Inventor
Frank B. Hurt
By Thos. B. Bilyeu
Attorney

Patented June 25, 1935

2,005,896

UNITED STATES PATENT OFFICE 2,005,896

AGGREGATE SPREADER

Frank B. Hurt, La Grande, Oreg.

Application November 19, 1932, Serial No. 643,432

9 Claims. (Cl. 275—14)

My invention relates to spreader heads to be used for the spreading of aggregates carried and delivered by standard truck bodies, into the spreader head that is to be attached thereto.

My invention is primarily comprised of a spreader head fabricated from standard structural members. This fabricated assembly is adapted for being placed upon and secured to, the rear end of a standard truck body of motor vehicles. The invention may be adapted to the motor vehicle body where the rear end gate of the truck is used or it may be so made that one wall of the spreader head will form the rear end gate of the truck.

My invention is adapted for spreading the shoulders only, of the roadway or for spreading one side only, of the roadway. It is also adapted for laying thicker coats of aggregate upon a part width of the roadway than other part widths of the roadway.

One of the objects of my invention consists in providing a spreader head that will spread the desired thickness of material upon the roadway and one that will spread the entire load of the truck in a uniform and desired thickness upon the roadway.

A still further object of my invention consists in so constructing the spreader head that it may be used for the spreading of the aggregate upon the roadway without the use of other attendants than the truck driver.

And a still further object of my invention consists in providing a spreader head attachment adapted for placement upon any and all standard trucks with a minimum of time delay and having a maximum aggregate spreading capacity.

And a still further object of my invention consists in so constructing the spreader head that the desired thickness of aggregate may be delivered upon the roadway, while the truck is being backed over the road and upon which the binding agent has been previously laid.

And a still further object of my invention consists in so constructing the rear end gate of the spreader head that the desired thickness of aggregates may be delivered upon the roadway.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a fragmentary, side view, of a truck and of the truck body. The truck body is shown elevated. In this view is shown an end view of my aggregate spreader head attached thereto.

Fig. 2 is a fragmentary, sectional, side view of the truck body and its frame and illustrates the body in lowered position. This view shows a sectional, end view of my improved aggregate spreader head attached thereto.

Fig. 3 is a rear, end view, partially in section of a portion of the truck body and a rear view partially in section of one of my aggregate spreader heads illustrated, as connected to the truck body.

Fig. 4 is a perspective, side view of the lever and quadrant assembly used for manually manipulating the closure gate of the spreader head.

Fig. 5 is a perspective, side view of the levers and of the shaft to which the same are to be attached for manually manipulating and setting the closure gate of the spreader head.

Fig. 6 is a perspective, side view of the lever to be used in the manipulating of the closure gate and illustrating the shaft to which the same is to be attached by suitable key connections.

Fig. 7 is a rear, end view of the assembly illustrating the same partially in section.

Fig. 8 is a diagrammatical layout of adjustable fins disposed within the spreader head, illustrating suitable adjustments for limiting the material to flow from one side only, of the spreader head.

Fig. 9 is a perspective, rear, side view of the end gate and a perspective end view of the spreader head.

Fig. 10 is a perspective, rear, side view of one of the connector plates that is adapted for being used in conjunction with the rear end gate illustrated in Fig. 9, and for adapting the same to the rear end of the truck body when the end gate is of less width than that of the rear end of the truck body.

Fig. 11 is a perspective, end view of the bottom plate used in connecting the assembly, illustrated in Fig. 9, to the truck body.

Fig. 12 is a perspective, rear view of a filler plate that is used in adapting the rear end gate assembly illustrated in Fig. 9, to the truck body.

Fig. 13 is a perspective, plan view of a top plate being used in conjunction with the channel bar illustrated in Fig. 12.

Figures 18, 19:
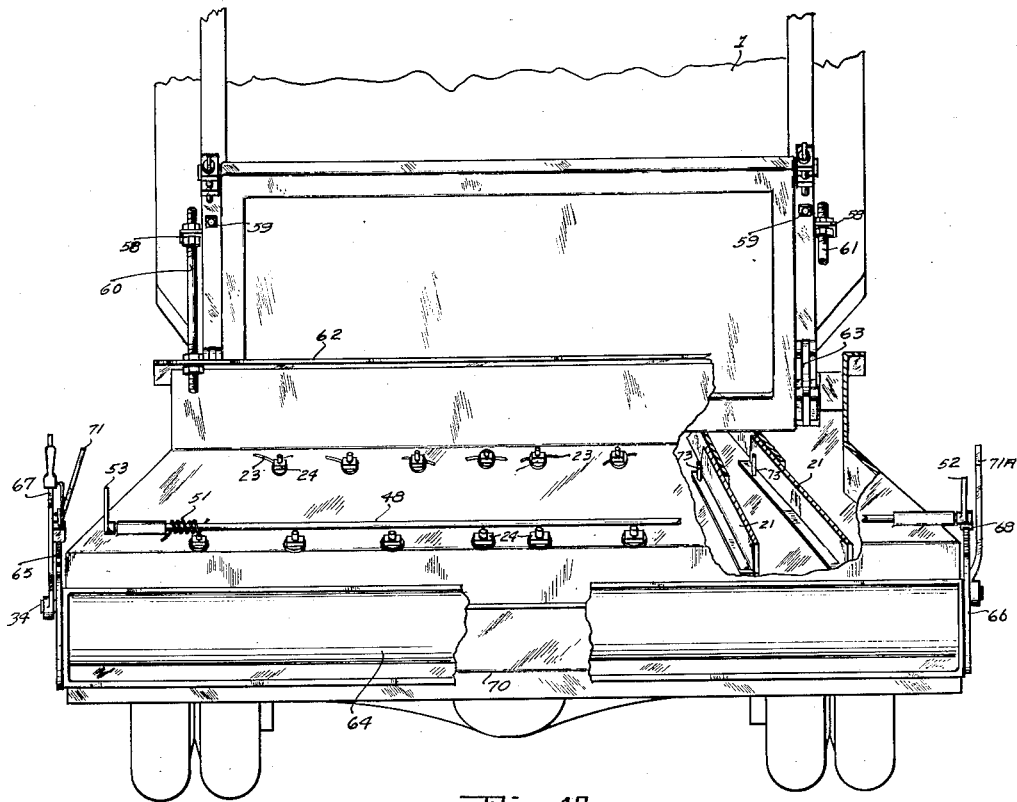

Fig. 14 is a fragmentary, sectional, side view of the rear end of the truck and illustrates the bar shown in Fig. 11 as being indirectly attached to the rear angle bar of the truck by the placing of Fig. 15 is a fragmentary, side view of the rear end of the truck and of the truck body and illustrating the truck body raised and the spreader head secured and attached thereto. In this view the rear end gate of the truck body is used as the rear end gate of the truck. Suitable bolts are used for adapting the spreader head to the truck body.

Fig. 16 is the same mechanism as illustrated in Fig. 15, excepting that the truck body has been lowered. The wings are shown secured to the rear end gate to prevent the side flow of the materials when the rear end gate has been extended.

Fig. 17 is a fragmentary, side view of the discharge gate assembly used upon the preferred embodiment of the spreader head.

Fig. 18 is a rear end view of the truck body and a fragmentary, and a partially sectional, end view of the spreader head shown attached to the truck body.

Fig. 19 is a view of the hopper and spreader as viewed from the interior of the truck looking rearwardly.

Like reference characters refer to like parts throughout the several views.

My invention is particularly adapted and used in the spreading of aggregates to form the top coating, or the top layers of roadways. The aggregate is delivered from a truck body 1. The truck body is adapted for being carried upon the frame 2 of the automobile truck. The truck body is adapted for being power raised about a center journal support 3, in order that the aggregates, to be spread, will flow by gravity from the rear end of the truck body directly into the spreader head.

In work of this kind it is generally desired to spread a width of aggregate that is greater than the total tread of the truck tires and of a width that is substantially greater than the width of the truck body. In order to accomplish this it is necessary that the point of discharge of the spreader head should be of maximum width that is greater than the over all width of the truck itself.

Since the truck body is to be tilted at a very substantial angle to the horizontal, the end gate of the truck, or the front wall of the spreader head should be sufficiently strong to carry the thrust of the aggregate load thereupon, when the truck body is tilted so that the aggregates will flow therefrom by gravity into the spreader head.

In the drawings I have illustrated a spreader head that may be adapted to the rear end of the truck body and upon which the spreader head is removably attached so that the rear end gate of the truck body may be used as the wall of the spreader head.

I have also shown the spreader head as being formed of a complete assembled unit. When this assembly is used the normal rear end gate of the truck is removed and the spreader head serves as the rear end gate of the truck assembly. I therefore do not wish to be limited in the application of my device to either form of construction as it may be used with equal facility in both forms.

I preferably form my spreader head and fabricate the same from structural members. A bottom plate 4 is used and a lip 5 of the bottom plate is so positioned that the top surface of the same will be substantially in line with the top surface of the bottom plate 7 of the truck body. An angle bar 8 is adapted to the cross beams 9 of the truck and the same is removably secured thereto through the use of any fastening bolts 10. A top plate 11 is spaced apart sufficiently from the bottom plate 4 to permit a free flowing of the aggregates from the truck body into the spreader head formed by the spaced bottom plate 4, and the top plate 11. The top plate is upturned, as illustrated at 12, and the same is raised sufficiently in height to form the rear end gate of the truck. Structural stiffening members 13 are secured to the plate 12, as by being welded thereto and the fastening eye-bolt 14 runs through the rear end gate and the same is fixed relative to the bolt, as through the use of one or more nuts 15. The eye-bolt 14 is hingedly disposed about a cross rod 16 that is disposed transversely of the top of the bed of the truck.

An end gate 17 is adapted to the rear wall of the spreader head. A lip 18 downwardly extends from the bottom plate 4 and a slit 19 is disposed in upwardly extending brackets 20, so that the end gate may be raised and lowered and positioned in precise position.

It is desired in a spreader of this type that a coating of spread aggregate should be substantially wider than the over all tread width of the truck tire in order that the aggregate spread may be deposited upon the binding agent in advance of the truck tire passing thereover. It is also found desirable to vary the thickness of the coating of aggregates from one side of the road to the other and also to limit the width and to predetermine the position of deposit of the layer of aggregates to be spread. It is also highly desirable to place a coating of greater width than that of the truck body and that of the over all width of the truck wheels, also.

I have found it highly desirable to place flow diaphragms 21 and secure the same as desired to the top and bottom plates 11 and 4 respectively. In order that these flow diaphragms may be precisely positioned to meet the requirements of the specification, I provide slots 22 within the bottom plates and slots 23 within the top plates and suitable fastening bolts 24 pass through the webs of the flow diaphragms and through the respective plates in order that the flow diaphragms may be positioned to desired placement.

The diaphragms toward the outside of the spreader head, when positioned as shown, create an undesirable space between their upper ends and the spillway of the truck body proper, through which space the aggregate would be free to flow into any of the channels formed by the diaphragms. To correct this difficulty, I provide extension plates 24A (see Figure 13) which are adjustably mounted to the ends of the diaphragm by means of bolts 24B.

The angle bar 8 has a plurality of slots 25 disposed therein in order that the angle bar may be positioned relative to the bottom plate 7 of the truck body and so that the bottom plate 4 of the spreader head may be precisely positioned in elevation relative to the bottom plate 7 of the truck body.

In order to accommodate for the various widths of trucks angle bars 26 and 27, as illustrated in Fig. 3, are secured to the outside of the truck frame, or body, and the end walls 28 and 29 of the spreader head form lips 30 and 31 disposed at their upper ends. Fastening bolts 32 and 33 pass through the lips and through the angle bars and secure the two together.

A shaft 34 runs longitudinally of the spreader head and is preferably placed on the underside of the spreader head. The shaft is journaled at one, or more points, through suitable journal boxes 35 that are secured to the plates from which the spreader head is formed. The gate may be made from a channel member. The legs of the channel are cut away adjacent the ends to provide a flat plate only, at the ends which is made to pass through the slits of the end plates.

A hand manipulative arm 38 is rockably disposed upon the shaft 34. The arm 38 has a foot 39 that outwardly extends from its base. The foot 39 passes through an opening 40 disposed within the gate plate and as the arm 38 is hand manipulated, the foot 39 is raised and lowered and simultaneously therewith the end gate 17 is raised and lowered, within the guideway 19. A quadrant 41 is secured to the arm 38, as by being riveted thereto as shown at 42.

Referring to Figs. 4, 5 and 6, arm 43 is keyed or otherwise secured to the shaft 34, and locking lever 44 is keyed, or otherwise secured to the shaft 34. The arm 38 is positioned relative to the lever 44 by a locking bolt upon the latter, functioning in conjunction with the quadrant 41. A link 46 connects the locking bolt with a hand release 47. The manipulation of the hand release 47 releases the locking bolt from the quadrant 41 and permits adjustment of the relative position of arm 38 with locking lever 44.

Relative variation of the depth of opening may be created within the spreader head by adjusting the relative position of the arm 38 and the arm 43 by means of locking lever 44. The raising and lowering of the gate is accomplished by the manual actuation of either of the arms 38 or 43.

A shaft 48 is disposed longitudinally of the spreader head and is preferably placed on the top of the same. A pawl 49 is mounted upon the shaft 48, and is adapted to coact with the quadrant 50 carried by the arm 43 to positively position shaft 34 and end gate 17. A reacting element, as a coil spring 51, normally maintains the pawl in registry engagement with the quadrant 50. The pawl 49 has an arm 52 upwardly extending therefrom to permit manipulation from one end of the spreader head, and an arm 53 is secured to the oppositely disposed end of the shaft 48 to permit manipulation from the corresponding end of the spreader head.

This construction enables a layer of aggregate of desired thickness or of desired variation of thickness, from one side to the other, to be discharged from the spreader head, and permits manipulation of the end gate from either end of the spreader head.

Where my spreader head is to be used in conjunction with a truck where the end gate of the truck is not removed from the truck, the device will be made as illustrated particularly in Figs. 15 and 16. When so made I provide wings 54 and 55 and secure the same to the rear end gate of the truck by any suitable fastening means as through the use of rivets 56. The wings are so positioned that they engage the inside wall 57 of the oppositely disposed sides of the truck body.

I place brackets 58 upon the outside of the truck body and secure the brackets to the body of the truck, through the use of fastening bolts 59. Rods 60 and 61 pass through the brackets and through the upturned angle 62 of the spreader head. In order to form compression and tension members of both of the rods 60 and 61, I thread each end of the rods and place a pair of nuts thereupon, one pair of the nuts being made to engage the oppositely disposed sides of the bracket 58 and the other pair of nuts being placed on the oppositely disposed sides of the angle 62.

The rear end gate of the truck is locked and released in the usual manner by the trip 63.

The end gate of the spreader head may be made, as illustrated in Figs. 15 to 17 inclusive. When so made the end gate 64 is removably secured to the quadrant carrying gate supporting members 65 and 66. The respective ends of the plate may be positioned by the hand lever 67 and by the pawl 68 relative to the quadrants disposed upon the quadrant carrying gate supporting members 65 and 66. This positions the lip 69 of the gate relative to the discharge point 70 of the bottom of the spreader head. Thereafter the gate as a whole may be hand manipulated, through the use of the hand manipulated lever 71.

The flow diaphragms 21 are formed with parallel slots 72. In order to stiffen the spreader head assembly, shoulder bolts 73 may be passed through the top and bottom plates and nuts 74 and 75 be threadably secured to the oppositely disposed end of each of the bolts.

It is desirable at times to discharge the aggregate flowing through the spreader head over a portion of the roadway only, or at one side of the roadway. I accomplish this by placing one or more auxiliary plates 76 as illustrated in Fig. 8 within the stream of aggregates. This is best accomplished by engagement of flow diaphragms 21 disposed therebehind one upon the other, and the auxiliary plate 76 is made to cover a sufficient amount of the same. This predetermines the point of discharge of the remainder of the aggregate through the spreader head. The diaphragms may be moved to the inactive positions by removing the bolts from their upper ends to permit swinging the diaphragms around the bolts at their lower ends.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. In a device of the class described, in combination with a truck body, of a bottom plate and a top plate spaced apart, the bottom plate adapted for being detachably secured to the truck body and the top plate being upturned to form the rear end gate of the truck, end walls affixed to the top and bottom plates and connecting them, structural stiffening members secured to that portion of the top plate that forms the rear end gate, flow diaphragms adjustably disposed between the top and bottom plates, a gate disposed at the rear of the top and bottom plates, slits disposed within the end walls and through which the ends of the gate are disposed, manually manipulative means for imparting movement to the gate and longitudinally of the slits, and settable means for predetermining the initial position of the gate within the respective slits.

2. In a device of the class described, in combination with a truck and truck body, of a spreader head detachably attachable to the truck body, the length of the spreader head being equal to or greater than the overall width of the truck, the spreader head being comprised of top and bottom plates, spaced apart and adapted for being removably secured to the truck body, end plates for the top and bottom plates, the top plate having a vertical extension adapted for forming the rear end gate of the truck, reinforcing structural members adapted to the vertical extension of the top plate, means disposed between the top and bottom plates for distributing the stream of aggregates flowing from the truck body of uniform thickness over the entire length of the bottom plate, and settable means for predetermining the thickness of the stream of aggregates flowing from the spreader head and for increasing or decreasing the thickness of the aggregate stream at one end of the spreader head relative to the other end of the spreader head.

3. In a device of the class described, in combination with a spreader head having a top plate and a bottom plate, of an end gate for the spreader head, a shaft extending longitudinally of the bottom plate of the spreader head and journaled relative thereto, a quadrant fixedly secured to one end of the shaft, a hand manipulative arm, carrying a quadrant, rockably secured to the other end of the shaft, a locking lever keyed to the end of the shaft to which the hand lever is rockably disposed, a hand releasing locking bolt associated with the locking lever and adapted for coacting with the quadrant of the rockably disposed hand manipulative arm, a foot carried by each of the hand manipulative arms, an end gate, an opening disposed in the oppositely disposed ends of the end gate and through which the foot of each of the hand manipulative arms pass, a shaft disposed longitudinally of the spreader head and journaled relative to the top plate of the spreader head, a locking pawl adapted for coacting with the quadrant that is secured to the hand manipulative arm that is fixedly secured to the shaft, means for normally maintaining the locking pawl in registry with the quadrant, and release arms associated with the oppositely disposed ends of the shaft.

4. In a device of the class described, the combination of top and bottom plates spaced apart, the top plate being upturned and adapted for forming the rear end gate of a truck when attached thereto, structural stiffener members formed integral with the outer edges of the end gate forming part of the top plate, means associated with the top and bottom plates adapted for engaging the assembly with the rear end of a truck body, end plates for the top and bottom plates, a gate mounted upon the rear ends of the top and bottom plates, manually settable means for positioning the gate, and flow diaphragms spaced apart and extending between and secured to the top and bottom plates.

5. In a device of the class described, the combination of top and bottom plates spaced apart, end plates for the top and bottom plates, the top plate upwardly extending to form the back end gate of a truck body when attached thereto, a settable pouring end gate mounted upon the rear ends of the top and bottom plates, manually settable means for positioning the end gate, flow diaphragms settably positioned between the top and bottom plates and means for locking the flow diaphragms relative to the top and bottom plates.

6. In a device of the class described, the combination of top and bottom plates spaced apart, end plates for the top and bottom plates, the top plate being reinforced and formed to engage the rear end of truck body and to form the rear end gate thereof, an end gate mounted upon the rear of the top and bottom plates, manually settable means for positioning the end gate, flow plates spaced apart and adapted for engaging the top and bottom plates and adapted for being secured thereto.

7. In a device of the class described, the combination of top and bottom plates spaced apart, end plates for the top and bottom plates, the top plate upwardly extending and adapted for forming the rear end gate of a dump body when attached thereto, an end gate settably mounted upon the rear of the top and bottom plates and a plurality of spaced plates disposed between the top and the bottom plates and adapted for being adjustably attached to the top and the bottom plates.

8. In a device of the class described, in combination with an automotive dump body, of a closure member adapted for closing the major portion of the discharge end of the truck body, spaced top and bottom plates adjustably secured to the closure member, end plates for the top and bottom plates, flow diaphragms adjustably disposed between the respective top and bottom plates, and a discharge gate adapted for being manually manipulated and for predetermining the thickness of the stream of material flowing through the discharge gate and the positioning of the stream flow therethrough.

9. In a device of the class described, in combination with a truck and truck body, of a spreader head removably securable to the truck body, the overall length of the spreader head being substantially greater than the overall width of the truck body, the spreader head comprising top and bottom plates spaced apart by flow diaphragms adjustably mounted therebetween to divide the stream of aggregates flowing from the truck body into a plurality of streams of equal volume, said diaphragms being pivoted at their lower ends to the top and bottom plates and adjustably mounted to the top and bottom plates at their upper ends by means of arcuate slots formed in said plates to receive bolts extending through said diaphragms, whereby upon removal of said bolts the diaphragms may be swung into overlapping position to close off any of said streams, and means adaptable to direct the flow of aggregate to the open streams, said means including a baffle plate adapted to lie across said overlapping diaphragms.

FRANK B. HURT.